US010055280B2

(12) United States Patent
Seibert et al.

(10) Patent No.: US 10,055,280 B2
(45) Date of Patent: Aug. 21, 2018

(54) DISCOVERY AND REMEDIATION OF A DEVICE VIA A PEER DEVICE (71) Applicant: Dell Products, L.P., Round Rock, TX (US)

(72) Inventors: Philip Seibert, Austin, TX (US); Anantha Boyapalle, Cedar Park, TX (US); Yuan-Chang Lo, Austin, TX (US); Marc Hammons, Round Rock, TX (US); Todd Swierk, Austin, TX (US)

(73) Assignee: Dell Products, L.P., Round Rock, TX (US)

( * ) Notice: Subject to any disclaimer, the term of this patent is extended or adjusted under 35 U.S.C. 154(b) by 190 days.

(21) Appl. No.: 15/163,130

(22) Filed: May 24, 2016

(65) Prior Publication Data
US 2017/0344420 A1 Nov. 30, 2017

(51) Int. Cl.
G06F 11/00 (2006.01)
G06F 11/07 (2006.01)
H04W 84/12 (2009.01)
H04W 76/14 (2018.01)

(52) U.S. Cl.
CPC ...... G06F 11/0793 (2013.01); G06F 11/0709 (2013.01); G06F 11/079 (2013.01); H04W 76/14 (2018.02); H04W 84/12 (2013.01)

(58) Field of Classification Search
CPC ............ G06F 11/0709; G06F 11/0748; G06F 11/0751; G06F 11/0793; G06F 11/2294; G06F 11/321; H04W 76/023; H04W 4/06; H04W 24/04
See application file for complete search history.

(56) References Cited

U.S. PATENT DOCUMENTS

| 2011/0083004 A1* | 4/2011 | Lipinski | G06F 11/0727 713/2 |
| 2015/0071052 A1* | 3/2015 | Hershberg | H04W 24/04 370/216 |
| 2016/0065410 A1* | 3/2016 | Brunet | H04L 41/0846 709/221 |
| 2017/0212799 A1* | 7/2017 | Konireddygari | G06F 11/0793 |

OTHER PUBLICATIONS

U.S. Appl. No. 14/736,100, filed Jun. 10, 2015.

* cited by examiner

Primary Examiner — Marc Duncan
(74) Attorney, Agent, or Firm — Fogarty LLP (57) ABSTRACT Methods, systems and devices for peer remediation of a malfunctioning IHS (Information Handling System). A malfunctioning IHS broadcasts a mayday beacon indicating a failure condition. The mayday beacon may be a peer-to-peer wireless broadcast using a Wi-Fi SSID that signals that the malfunctioning IHS is searching for a peer IHS configured to provide remediation resources. A peer IHS configured to provide peer remediation responds to the mayday beacon. A peer peer-to-peer wireless connection, such as a Wi-Fi direct connection, is established and used by the malfunctioning IHS to access remediation resources stored on the peer IHS. The remediation resources, which may include a service operating system, are run on the malfunctioning IHS from the peer IHS. The peer IHS may utilize diagnostic information provided by the malfunctioning IHS to determine the remediation resources to be used. The peer IHS may utilize a remote diagnostic service for determining the remediation resources.

18 Claims, 4 Drawing Sheets

DISCOVERY AND REMEDIATION OF A DEVICE VIA A PEER DEVICE

FIELD

This disclosure relates generally to remediation of malfunctioning Information Handling Systems (IHSs), and more specifically, to remediation of malfunctioning IHSs via a peer IHS.

BACKGROUND

As the value and use of information continues to increase, individuals and businesses seek additional ways to process and store information. An option is an Information Handling System (IHS). An IHS generally processes, compiles, stores, and/or communicates information or data for business, personal, or other purposes. Because technology and information handling needs and requirements may vary between different applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, global communications, etc. In addition, IHSs may include a variety of hardware and software components that may be configured to process, store, and communicate information and may include one or more computer systems, data storage systems, and networking systems.

As the size of networks comprised of IHSs increases, the burden of administering the devices that comprise the network of IHSs also increases. In general, a significant portion of these administrative services are currently provided remotely. In situations where remote administration is not possible, potentially as a result of an IHS malfunction, the remote administrative services that would otherwise be relied on by a user are not available. In such situations, remediation of a malfunctioning IHS may require manual administration of the malfunctioning IHS. Manual administration may delay remediation due to the relative inefficiency of this process, especially if provided via telephone.

In addition to preventing remote administration, the nature of an IHS malfunction may also limit the functionality of the malfunctioning IHS. For instance, a hard drive failure may prevent an IHS from accessing an operating system and thus prevent the IHS from booting. Such a failure effectively disables most IHSs, especially IHSs owned and managed by retail consumers. However, certain aspects of the IHS may still remain functional. For instance, certain networking interfaces that may be used to establish a peer-to-peer connection with a nearby IHS.

SUMMARY

Embodiments described herein provide methods, systems and devices for peer remediation of a malfunctioning IHS that maintains sufficient functionality to broadcast and process responses to a mayday beacon that indicates a failure condition. The mayday beacon may be a peer-to-peer wireless broadcast that signals that the malfunctioning IHS is searching for a peer IHS configured to provide remediation resources. Upon receiving a response from a peer IHS configured to provide peer remediation, a peer peer-to-peer wireless connection is established and used by the malfunctioning IHS to access remediation resources stored on the peer IHS. The remediation resources, which may include a service operating system, are run on the malfunctioning IHS from the peer IHS.

According to various embodiments, a method for remediation of a malfunctioning IHS comprises broadcasting a peer-to-peer wireless signal indicating a failure condition in the malfunctioning IHS; receiving a response to the wireless broadcast signal from a peer IHS configured to provide a remediation resource; establishing a peer-to-peer wireless connection with the peer IHS; accessing a remediation resource from the peer IHS via the established peer-to-peer connection; and running the remediation resource on the malfunctioning IHS.

According to various additional embodiments, the peer-to-peer wireless signal is a Wi-Fi Direct signal. According to various additional embodiments, the peer-to-peer wireless signal broadcast includes an SSID (Service Set Identifier) indicating a remediation request by the malfunctioning IHS. According to various additional embodiments, the remediation resource is a service operating system. According to various additional embodiments, the method further comprises booting the service operating system from the peer IHS over the peer-to-peer wireless connection. According to various additional embodiments, the booted service operating system provides a remediation interface on the peer IHS that allows remote access to the service operating system. According to various additional embodiments, the remediation resource has been preemptively stored in a memory of the peer IHS based on the platform of the malfunctioning IHS. According to various additional embodiments, the wireless broadcast signal is triggered by one or more boot failures by the malfunctioning IHS.

According to various embodiments, a method for remediation of a malfunctioning IHS by a peer IHS comprises monitoring for a peer-to-peer wireless signal broadcast indicating a failure condition in the malfunctioning IHS; responding to the wireless broadcast signal issued by the malfunctioning IHS; establishing a peer-to-peer wireless connection with the malfunctioning IHS; and providing a remediation resource to the malfunctioning IHS via the established peer-to-peer connection.

According to various additional embodiments, the monitoring for a peer-to-peer wireless signal broadcast is triggered based on a user-issued command. According to various additional embodiments, the method further comprises receiving error condition information from the malfunctioning IHS via the established peer-to-peer connection; and retrieving the remediation resource from a remote repository, wherein the remediation resource is retrieved based on the error condition received from the malfunctioning IHS. According to various additional embodiments, the method further comprises determining the platform type of one or more IHSs within wireless signal broadcast range; and storing one or more remediation resources based on the determined platform types. According to various additional embodiments, the remediation resource provided to the malfunctioning IHS is remediation resource stored based on the determined platform types. According to various additional embodiments, the peer-to-peer wireless signal is a Wi-Fi Direct signal. According to various additional embodiments, the peer-to-peer wireless signal broadcast includes an SSID (Service Set Identifier) indicating a remediation request by the malfunctioning IHS. According to various additional embodiments, the remediation resource is a service operating system. According to various additional embodiments, the service operating system is booted by the malfunctioning IHS from the peer IHS over the peer-to-peer wireless connection. According to various additional embodiments, the booted service operating system provides a remediation interface on the peer IHS that allows remote access to the service operating system.

According to various embodiments, a method for providing a diagnostic service for peer remediation of a plurality of malfunctioning IHSs comprises receiving diagnostic information from a plurality of peer IHSs, wherein the diagnostic information is provided to each of the peer IHSs by a of the malfunctioning IHS; analyzing the diagnostic information provided for each of the malfunctioning IHSs to determine remediation resources to provide to each individual malfunctioning IHS of the plurality malfunctioning IHSs; analyzing the diagnostic information provided for each of the malfunctioning IHSs to identify error conditions common to multiple of the malfunctioning IHSs and to determine additional remediation actions. According to various additional embodiments, the diagnostic service determines the remediation resources to provide to an individual malfunctioning IHS based on platform information specified in the diagnostic information provided by the individual malfunctioning IHS.

BRIEF DESCRIPTION OF THE DRAWINGS

The present invention(s) is/are illustrated by way of example and is/are not limited by the accompanying figures, in which like references indicate similar elements. Elements in the figures are illustrated for simplicity and clarity, and have not necessarily been drawn to scale.

DETAILED DESCRIPTION

For purposes of this disclosure, an Information Handling System (IHS) may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an IHS may be a personal desktop or laptop computer, a mobile phone, a tablet, a 2-in 1 laptop/tablet, a server computer, a consumer electronic device, a gaming console, a printer, an automobile information system, a network storage device, a network router, a network video camera, or any other suitable device and may vary in size, shape, performance, functionality, and price. The IHS may include memory, one or more processing resources, e.g., a central processing unit (CPU) or hardware or software control logic. Additional components or the IHS may include one or more storage devices, one or more communications ports for communicating with external devices as well as various input and output (I/O) devices, e.g., a keyboard, a mouse, and a video display. The IHS may also include one or more buses operable to transmit communication between the various hardware components.

Also for purposes of this disclosure, computer-readable media may include any instrumentality or aggregation of instrumentalities that may retain data and/or instructions for a period of time. Computer-readable media may include, without limitation, storage media, e.g., a direct access storage device (e.g., a magnetic hard drive, an optical drive, a solid-state drive), a sequential access storage device (e.g., a tape drive), compact disk, CD-ROM, DVD, random access memory (RAM), read-only memory (ROM), electrically erasable programmable read-only memory (EEPROM), and/or flash memory. Computer-readable media may also include optically readable barcodes (one or two-dimensional), plastic cards with embedded magnetic stripes, mechanically or optically read punched cards, or radio frequency identification tags.

An IHS may experience a wide range of possible error conditions that result in a malfunction. Such malfunctions may require remediation in order to correct the error conditions such that user of the IHS can resume normal operations, or at least continue the remediation process in another fashion. In certain scenarios, a malfunctioning IHS may be unable to boot its primary operating system (primary OS), thus rending the IHS unusable. In certain other scenarios, a malfunctioning IHS may be able to boot its primary operating system, but remediation is still required due to error conditions that serve to partially disable the IHS such that it is effectively unusable. In certain scenarios, a malfunctioning IHS may be able to load a secondary operating system or a "safe mode" variant of its primary operating system. In such scenarios, remediation may still be required in order to enable the malfunctioning IHS to boot its primary operating system.

The error conditions that contribute to the IHS malfunction may preclude certain remediation procedures and may complicate identification of the malfunctioning IHS. For instance, an error condition may prevent the malfunctioning IHS from certain error notification procedures. In one scenario, a failure to boot the primary operating system by a malfunctioning IHS may result in the complete loss of remote administrative capabilities. In other scenarios, an IHS may be able to load its primary OS, but remote administrative tools may nonetheless be rendered ineffective due to error conditions in the IHS. Depending on the error condition, remote administrative tools may be of little use such that the remediation of the IHS malfunction may require manual identification, diagnosis and repair of the error condition.

Once the malfunctioning IHS has been identified, the nature of the malfunction may also prevent efficient transfer of remediation resources to the malfunctioning IHS using remote administration tools. In scenarios where remote administrative tools have been rendered ineffective, remediation of the malfunctioning IHS may require physically locating and administering the malfunctioning IHS. In systems comprised of large numbers of IHSs, such as an enterprise data center comprised of multiple racks filled with almost identical servers, such manual administrative procedures are burdensome.

Various embodiments provide remediation of a malfunctioning IHS using resources provided by a peer IHS that is functioning properly. In certain scenarios, the nature of an IHS malfunction may allow remediation procedures through a peer IHS where remote administrative tools are not capable of addressing the malfunction. In certain such scenarios, limited communication abilities available by the malfunctioning IHS may be utilized to establish a peer-to-peer connection to a peer IHS that is located in relatively close proximity to the malfunctioning IHS. By retrieving remediation resources via a peer IHS, the malfunctioning IHS may be at least partially remediated such that remote administration tools can be utilized. The use of remediation tools provided by a peer IHS also allows a standard suite of remediation procedures to be attempted without requiring involvement by a human administrator, thus providing an opportunity to potentially remediate the malfunctioning IHS without the delays attendant with a human administrator identifying, diagnosing and repairing the error condition.

Figure 1:
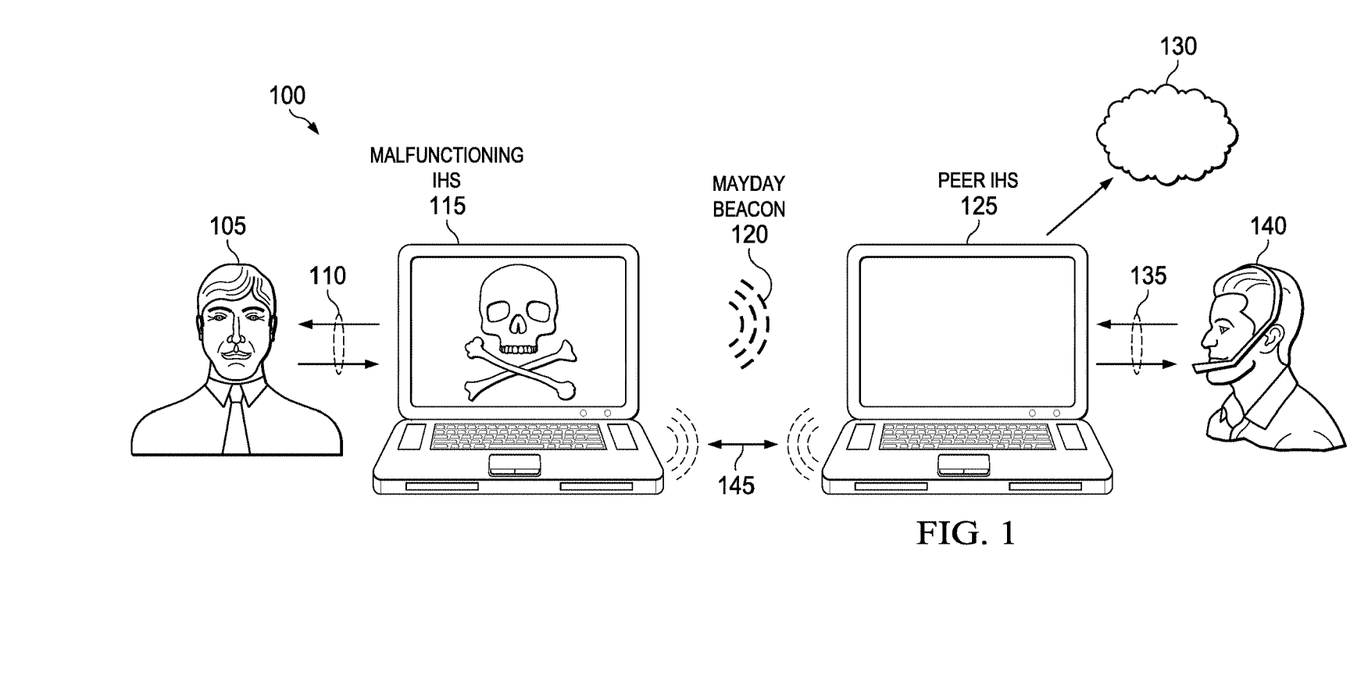
FIG. 1 is a diagram illustrating an example of an environment where systems and methods for providing remediation resources via a peer IHS may be implemented according to various embodiments.

FIG. 1 illustrates a system according to various embodiments that is configured to provide remediation of a malfunctioning IHS 115 via a peer IHS 125 that is in relatively close proximity. In certain scenarios, the malfunctioning IHS 115 may be effectively disabled such that user 105 has no means for input or output 110. In certain other scenarios, the malfunctioning IHS 115 is partially disabled such that certain input and/or output 110 functions are available. In certain embodiments, the malfunctioning IHS 115 may be configured to utilize any available input and/or output 110 capabilities to prompt the user 110 to initialize a peer remediation process. In certain embodiments, the malfunctioning IHS 115 may be configured to automatically initiate a peer remediation process as soon as certain error conditions are detected. For instance, certain embodiments may be configured to initiate peer remediation for an IHS upon detecting repeated failed attempts to boot the main operating system of an IHS. In addition to or instead of failed boot attempts, certain embodiments may utilize additional error conditions and/or fault codes to trigger peer remediation.

Once peer remediation has been initiated, the malfunctioning IHS 115 may begin attempts to identify and connect to a peer IHS that is configured to provide peer remediation. In certain embodiments, the malfunctioning IHS 115 may broadcast its status via a mayday beacon 120. In certain embodiments, the mayday beacon 120 is broadcast by a malfunctioning IHS 115 via a peer-to-peer wireless signal, such as a Wi-Fi or Bluetooth signal. In certain of such embodiments that utilize Wi-Fi signaling, the mayday beacon may broadcast a Wi-Fi SSID that serves to signal that the malfunctioning IHS 115 is searching for a peer IHS that can provide remediation resources. In certain embodiments, the Wi-Fi SSID is a Wi-Fi Direct access point broadcast that identifies the malfunctioning IHS 115 as configured to connect to a peer IHS via a peer-to-peer Wi-Fi Direct connection.

According to various embodiments, the peer IHS 125 may be configured to scan for mayday beacon broadcasts. In certain embodiments, the peer IHS 125 may be configured to periodically scan for mayday beacon broadcasts. In certain embodiments, the peer IHS 125 may be configured to begin scanning for mayday beacon broadcasts based on a command issued via a remote administration tool or diagnostic service. The command may be issued to the peer IHS 125 based on input 135 provided by a human administrator 140. The command may also or instead be issued automatically by a diagnostic service upon detecting an error condition or extended offline status by the malfunctioning IHS 115, thus indicating the need for remediation. In certain embodiments, the peer IHS 125 is configured to scan for Wi-Fi SSIDs that have been specified as indicating a peer remediation request.

Upon detection of a mayday beacon, the peer IHS 125 may be configured to respond by initiating a peer-to-peer wireless connection 145, such as a Wi-Fi Direct connection, with the malfunctioning IHS 115. The wireless connection may be initiated upon authentication of the malfunctioning IHS 115 and peer IHS 125. Once the peer-to-peer wireless connection 145 is established, the peer IHS 125 may transmit various remediation resources to the malfunctioning IHS 115 via the wireless connection 145. In certain embodiments, the remediation resources provided by the peer IHS 125 may be a service OS that allows the malfunctioning IHS 125 to boot to a state that allows diagnosis and repair of the malfunction. More specifically, a peer IHS 125 may store a service OS in a remediation storage partition this is made accessible to the malfunctioning IHS 115. Once peer remediation has been initiated and the peer-to-peer connection 145 has been established, the malfunctioning IHS 115 mounts the peer IHS 125 remediation partition and boots the service OS. In certain embodiments, the remediation resources provided by the peer IHS 125 may allow remote administration by a human administrator 145. In certain embodiments, the peer IHS 125 may utilize the wireless connection 145 to obtain information describing the platform of the malfunctioning IHS 115 and/or specific error conditions and logs reported by the malfunctioning IHS 115. Such information may then be used by the peer IHS 125 to obtain updated or otherwise targeted remediation resources from a remote repository 130.

Figure 2:
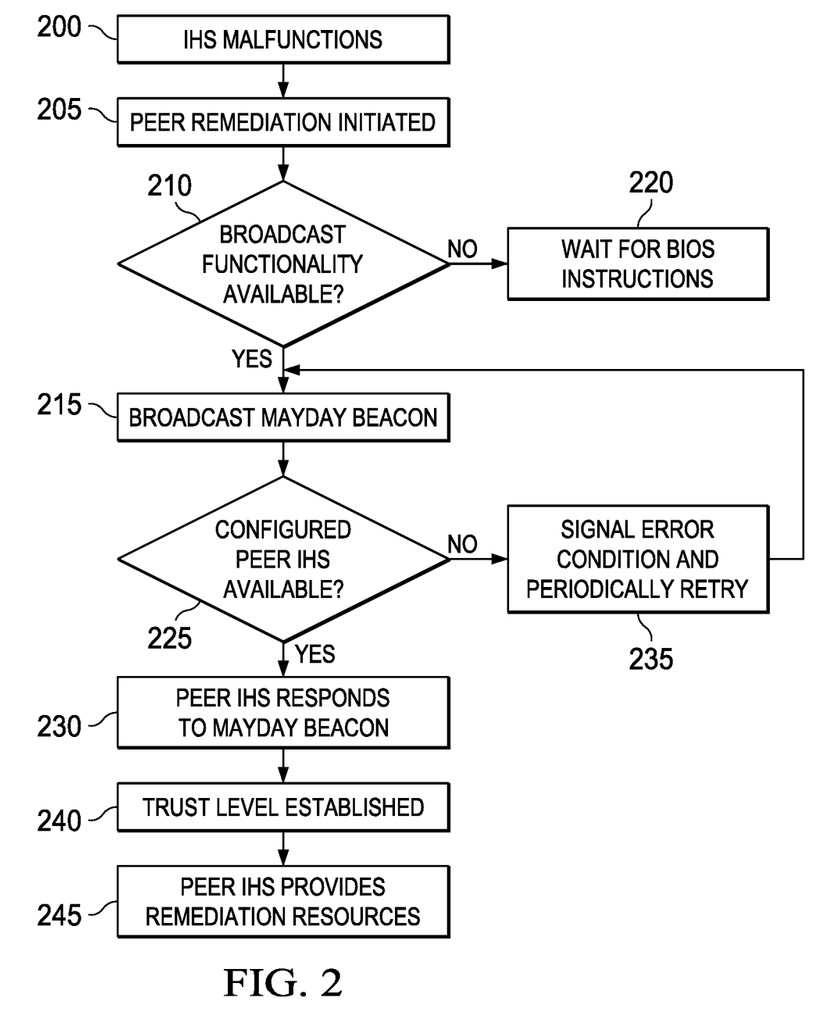
FIG. 2 is a flowchart depicting certain steps of a process for providing remediation resources via a peer IHS according to various embodiments.

FIG. 2 is a flowchart illustrating certain steps of a process according to various embodiments by which a peer IHS may be utilized to provide remediation resources to a malfunctioning IHS. The remediation procedure in the embodiment of FIG. 2 begins at step 200 upon the malfunctioning IHS experiencing an error condition that triggers the peer remediation process. As described above, the peer remediation process may be triggered 205 according to various embodiments based on successive boot failures, commands issued by the user of the malfunctioning IHS via any available functionality of the IHS (e.g., pre-boot keystroke commands), commands issued via a remote administrative resource and/or the detection of certain error conditions.

Once the peer remediation process has been initiated, at step 210, the malfunctioning IHS is configured according to various embodiments to determine whether wireless broadcast functionality is available. As described with respect to FIG. 1, embodiments may utilize a peer-to-peer wireless protocol, such as Wi-Fi Direct, for establishing a connection to a peer IHS. In such embodiments, the malfunctioning IHS determines whether Wi-Fi broadcast capabilities are available.

In certain scenarios, broadcast abilities may be unavailable, but wireless reception functionality may still be available to the malfunctioning IHS. In certain embodiments, in response to determining a lack of broadcast capabilities, the malfunctioning IHS may be configured to scan for available wireless connections that indicate the presence of a peer IHS that may be able to provide remediation resources. In certain embodiments, a peer IHS may broadcast a wireless signal, such as a Wi-Fi Direct broadcast, that indicates that the peer IHS is configured to provide peer remediation. In certain of such embodiments, the SSID used by the peer IHS Wi-Fi broadcast has been specified as indicating a provider of peer remediation. The peer IHS may be configured to initiate a peer remediation broadcast based on a command received by a diagnostic service that has identified a possible failure in the malfunctioning IHS. The peer IHS may also be configured to initiate a peer remediation broadcast based on a locally derived indicator of possible failure in a neighboring IHS, such as the failure of a neighboring IHS to forward a token in a token ring network that links a set of IHSs.

A peer IHS may be further configured to provide remediation resources directly to a neighboring IHS that has a possible malfunction even though the neighboring IHS has not responded to a peer remediation broadcast by the peer IHS. In scenarios where the malfunctioning IHS has only wireless reception capabilities, and no transmission capabilities, the ability of a peer IHS to push remediation resources directly to the malfunctioning IHS allows remediation to proceed. In certain embodiments, the peer IHS and/or the malfunctioning IHS may be configured to require certain authentication in order to allow pushing of remediation resources in the manner. In certain embodiments, this authentication may proceed using pre-established trust levels between the peer IHS and the malfunctioning IHS. In scenarios where remediation resources are pushed directly to the malfunctioning IHS, the remediation resources provided by the peer IHS may be selected based on the limited transmission capabilities of the malfunctioning IHS.

If wireless broadcast functionality is available to the malfunctioning IHS, a mayday beacon is broadcast at step 215. As described above, in certain embodiments, the mayday beacon may be a Wi-Fi SSID broadcast that utilizes an SSID that has been specified as indicating a malfunctioning IHS that seeks remediation via a peer IHS. Other embodiments may utilize other wireless broadcast capabilities, such as Bluetooth, that allow a connection to a peer IHS in relatively close proximity to the malfunctioning IHS. At step 220, it is determined whether a peer IHS is within broadcast range of the malfunctioning IHS and is capable of providing peer remediation. As described above, in certain embodiments, a peer IHS may be configured to scan for mayday beacons at periodic intervals and/or upon receipt of a command from a remote administrative resource. If no response is received from a peer IHS, at step 235, the malfunctioning IHS may retry its mayday beacon broadcast at certain intervals.

If a peer IHS detects a mayday beacon at step 230, the peer IHS responds by negotiating a peer-to-peer connection to the malfunctioning IHS via the wireless signaling protocol used by the mayday beacon. In embodiments utilizing Wi-Fi Direct, the peer IHS negotiates a Wi-Fi Direct connection via the access point identified by the Wi-Fi SSID that is broadcast by the malfunctioning IHS. In certain scenarios, multiple peer IHSs configured to respond to mayday beacons may be within broadcast range of a malfunctioning IHS that is broadcasting a mayday beacon. In such situations, the malfunctioning IHS may be configured to select one of the responding peer IHSs and to pursue peer remediation with the selected peer IHS.

In certain embodiments, a malfunctioning IHS may be configured to select from among the responding peer IHSs based on the platform of the IHSs. In certain of such embodiments, a malfunctioning IHS may be configured to initiate remediation with a responding peer IHS that is of the same family as the malfunctioning IHS. In certain embodiments, a peer IHS of the same family as the malfunctioning IHS may be configured to store local copies remediation resources that are targeted towards the family of platforms to which the peer IHS and malfunctioning IHS both belong. For instance, if a malfunctioning IHS is a Dell Inspiron laptop, this malfunctioning IHS may be configured to select a responding peer IHS that is also a Dell Inspiron laptop since this peer IHS may be configured to store remediation resources that are specifically intended for use by this family of laptops.

In certain embodiments, a malfunctioning IHS may be configured to query the responding peer IHSs in order to identify a peer IHS that has specific remediation resources. For instance, in certain embodiments a malfunctioning IHS may select a peer IHS based on which of the responding peer IHSs have the most current remediation resources stored locally. Certain embodiments may be configured to select the peer IHS that is in closest proximity to the malfunctioning IHS or to select the peer IHS that can provide the highest bandwidth wireless connection, such as a Wi-Fi Direct connection, by which to transfer remediation resources.

At step 240, according to various embodiments, the trust level is established between the peer IHS and the malfunctioning IHS. In certain embodiments, the malfunctioning IHS may include authentication information as part of its mayday beacon broadcast. For instance, certain embodiments may include an encrypted passcode that can be used by the peer IHS to authenticate the malfunctioning IHS. In certain other embodiment, the malfunctioning IHS may include a certificate that authenticates ownership of an encryption key that can be used to conduct secure communications with the malfunctioning IHS. As described, in certain embodiments a malfunctioning IHS may broadcast authentication information as an aspect of a mayday beacon. In other embodiments, authentication information may instead be exchanged as part of a handshake process that is initiated upon the peer IHS responding to the mayday beacon of the malfunctioning IHS.

In certain embodiments, the trust level between the malfunctioning IHS and a peer IHS may be pre-established as an aspect of configuring these IHSs for peer remediation. For instance, IHSs may be configured to authenticate peer IHSs that are located within broadcast range and are configured to provide peer remediation. This pre-authentication step may be used by a properly functioning IHS to store information that can be used to authenticate peer IHSs that respond to a mayday beacon that is issued upon a malfunction in the IHS. Certain embodiments may utilize roots of trust that can be relied upon as a form of authentication, such as indications that both IHSs are components of a trusted network.

In certain scenarios, the error conditions resulting in the IHS malfunction may prevent or significantly limit the malfunctioning IHS's ability to provide authentication information. In certain embodiments, the malfunctioning IHS may be configured to broadcast or otherwise provide a unique identifier associated with the malfunctioning IHS that may be used to authenticate the peer-to-peer connection. In certain embodiments, the unique identifier may be a unique Dell service tag identifier assigned to an IHS. In such embodiments, the peer IHS may be configured to utilize the provided identifier to retrieve authentication information, such as a passcode, by which to authenticate the malfunctioning IHS. In certain embodiments, the malfunctioning IHS and peer IHS may forgo authentication and instead utilize checksums to ensure the authenticity of the provided remediation tools.

Referring back to the remediation process depicted in FIG. 2, at step 245, the remediation continues with the peer IHS providing remediation tools to the malfunctioning IHS. In certain embodiments, the malfunctioning IHS may be configured to provide diagnostic information to the peer IHS. For instance, the malfunctioning IHS may be configured to transmit platform information, failure information and/or logs to the peer IHS. Platform information, such as provided by a platform identifier, may describe hardware and/or software properties of the malfunctioning IHS. In certain embodiments, platform information may be provided using a Dell service tag identifier that uniquely identifies a computing device and can be used to retrieve detailed hardware and software properties of the computing device. Failure information provided by the malfunctioning IHS may descried error conditions or faults detected by the malfunctioning IHS. The logs may be any log maintained by the malfunctioning IHS and may itself contain platform information and/or failure information. The malfunctioning IHS may be configured to transmit certain diagnostic information, such as platform information and error conditions, by encoding such diagnostic information in QR codes that are transmitted to the peer IHS and can be further relayed to a diagnostic service for additional analysis. Configured in this manner, the peer IHS may serve as conduit for the transmission of diagnostic information to a remote diagnostic service that can utilize this diagnostic information to determine the remediation procedures that are most likely to repair the malfunctioning IHS.

In certain embodiments, the malfunctioning IHS may be configured to broadcast diagnostic information via the mayday beacon. In such embodiments, the peer IHS is configured to decode any diagnostic information broadcast by the mayday beacon. In certain embodiments, the malfunctioning IHS may be configured to transmit diagnostic information to the peer IHS once a peer-to-peer connection has been established between the malfunctioning IHS and the peer IHS. Certain embodiments may transmit certain diagnostic information via a mayday beacon broadcast and utilize the peer-to-peer connection for transmitting additional diagnostic information. For instance, platform information may be encoded in the mayday beacon transmitted by a malfunctioning IHS, but logs may only be transmitted by the malfunctioning IHS via the peer-to-peer connection to the peer IHS. In certain embodiments, the platform information for the malfunctioning IHS may be provided in the form of a unique Dell service tag identifier that is assigned to the IHS.

In certain embodiments, diagnostic information provided by the malfunctioning IHS may be used by the peer IHS to retrieve remediation tools from a remote repository. In certain embodiments, the diagnostic information provided may include platform information certain hardware and/or software properties of the malfunctioning IHS. In certain embodiments, the malfunctioning IHS may provide a platform identifiers, such as a unique Dell service tag identifier assigned to the IHS, that can be used to retrieve detailed hardware and/or software information regarding the malfunctioning IHS. The peer IHS may be further configured to utilize a platform identifier provided by the malfunctioning IHS to retrieve remediation resources that are specifically targeted to the hardware and/or software of the malfunctioning IHS. In certain embodiments, the malfunctioning IHS may provide diagnostic information generated using a pre-boot diagnostic process. For instance, certain embodiments may utilize a Dell ePSA (Enhanced Pre-Boot System Diagnostics) pre-boot diagnostic process that can be run by the BIOS/UEFI of the malfunctioning IHS.

In certain embodiments, the peer IHS may be configured to utilize diagnostic failure information provided by the malfunctioning IHS to retrieve specific remediation resources from a remote repository. For instance, error code information may be used by the peer IHS to retrieve remediation resources that are targeted to the specific error conditions reported by the malfunctioning IHS. In certain scenarios, the peer IHS may be configured to utilize any provided diagnostic information to connect with a backend service and initiate a warranty check regarding the malfunctioning IHS. In certain of such scenarios, the peer IHS may be configured to proceed with the peer remediation, only if the warranty check indicates the malfunctioning IHS qualifies for this level of support.

In certain embodiments, diagnostic information may be provided by the peer IHS to a diagnostic service configured to analyze the provided diagnostic information to determine the remediation resources that are most likely to remediate the malfunctioning IHS. For instance, the diagnostic service may be configured to process logs provided by the malfunctioning IHS, in order to identify remediation resources that are targeted at the specific error conditions reported in the logs. In certain embodiments, the analysis conducted by the diagnostic service may determine that a hardware failure in the malfunctioning IHS requires replacing the failed hardware in order to remediate the malfunctioning IHS. The diagnostic service may be further configured to source the hardware needed by the malfunctioning IHS. In certain embodiments, the analysis conducted by the diagnostic service may determine that one or more upgrades to the software of the malfunctioning IHS are necessary in order to remediate the IHS. The diagnostic service may be configured to locate the needed software upgrades and provided them to the peer IHS for installation by the malfunctioning IHS.

In certain embodiments, the diagnostic service may be configured to analyze diagnostic information provided by multiple participating peer IHSs. In such embodiments, the diagnostic service may be configured to analyze the aggregate diagnostic information in order to identify patterns and trends. For instance, a diagnostic service may be configured to recognize that error conditions reported by multiple malfunctioning IHSs indicate that the failures are a result of a common software upgrade by each of the malfunctioning IHSs. In such scenarios, the diagnostic service may be further configured to provide remediation resources that cause the malfunctioning IHSs to roll back the identified upgrade. In certain embodiments, the diagnostic service may be further configured to identify cascading error conditions that have caused failures in peer IHSs responding to peer remediation requests. In such scenarios, the diagnostic service may be further configured to signal peer IHSs to abandon peer remediation.

In scenarios, where no diagnostic information is provided by the malfunctioning IHS, the peer IHS may still access a remote repository to obtain the most up to date remediation resources that are available. In certain embodiments, a peer IHS may not be configured to store any remediation resources locally and thus must retrieve any remediation resources from a remote repository. In other embodiments, a peer IHS may preemptively store a selected set of remediation resources locally, but still utilize a remote repository to verify the remediation resources to be provided are the most recent versions of these resources. In embodiments where certain remediation resources are preemptively stored by a peer IHS, any diagnostic information provided by the malfunctioning IHS may be used by the peer IHS to select the preemptively storage remediation resources to provide the malfunctioning IHS. In certain embodiments, a peer IHS may be configured to store remediation resources only for certain platform types, such as the family of computers to which the peer IHS belongs, and may be further configured to retrieve remediation resources for all other platforms from a remote repository.

In embodiments where selected remediation resource are preemptively stored by the peer IHS, the remediation resources selected for preemptive storage may be based on the platform types of IHS within peer-to-peer broadcast range of the peer IHS. A peer IHS may be periodically provided with remediation resources for preemptive storage. In such scenarios, the remediation resources provided to the peer IHS are selected by a diagnostic service with knowledge of the physical location and platform information for the IHSs participating in the peer remediation service. A diagnostic service with such information may determine the neighboring IHSs that are within peer-to-peer broadcast range of the peer IHS and select remediation resource for preemptive storage by the peer IHS that are most likely to be requested by one of these neighboring IHSs within broadcast range of the peer IHS.

In certain embodiments, the diagnostic service may issue a configuration command to all IHS participating in the peer remediation service. On receipt of the configuration command, each participating IHS may be configured to broadcast configuration information using a peer remediation configuration beacon. Similar to the mayday beacon, the peer remediation configuration beacon may utilize an SSID indicating that an IHS is participating in the peer remediation service. The peer remediation configuration beacon may encode platform information for the broadcasting IHS. In other embodiments, platform information may be exchanged through the peer-to-peer connections that are established between that neighboring IHSs that respond to configuration beacons. In embodiments that utilize a configuration beacon, each participating IHS may utilize the platform information reported by neighboring IHSs to select the remediation resources to be preemptively stored. In certain embodiments, a participating IHS may relay reported platform information to a diagnostic service, which analyzes the platform information to select the remediation resources to be preemptively stored by each participating IHS. The diagnostic service may analyze the platform information provided by each IHS individually or may analyze all reported platform information in aggregate in order to select the remediation resources for each individual IHS.

Figure 3:
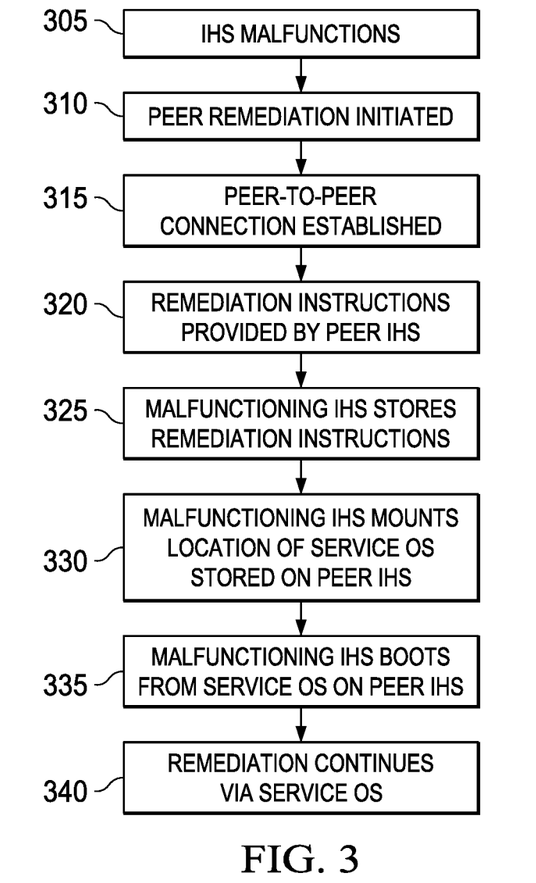
FIG. 3 is a flowchart depicting certain steps of a process for remediation of a malfunctioning IHS via a peer IHS according to various embodiments.

FIG. 3 illustrates certain steps of a process by which certain remediation resources may be used by a peer IHS in remediating a malfunctioning IHS. Similar to the process illustrated with respect to FIG. 2, the process begins as step 305 with the malfunction of an IHS and continues at step 310 with the triggering of the peer remediation process, such as described above, due to repeated failed attempts to boot to the main OS of the malfunctioning IHS. As described above, a malfunctioning IHS may utilize a mayday beacon to seek out a connection to a peer IHS that is configured to provide peer remediation services. At step 315, a peer-to-peer connection, such as a Wi-Fi Direct connection, is established between the malfunctioning IHS and the peer IHS.

Once a peer-to-peer connection has been established between a malfunctioning IHS and a peer IHS, the peer-to-peer connection may be used to transmit remediation resources from the peer IHS to the malfunctioning IHS. The remediation resources that are provided may be one of various software programs, firmware, scripts, upgrades, patches, drivers, tools and/or instructions that are configured to diagnose and/or repair error conditions. As described, the remediation resources provided by the peer IHS may be a service OS, which may be selected based on any diagnostic information provided by the malfunctioning IHS. A service OS may be a limited-functionality operating system compared to the main OS utilized by an IHS. A service OS may include one or more program instructions or that, upon execution by an IHS, enable one or more support, diagnostics, or remediation operations to be performed independently from the main OS. The service OS may include one or more service and support applications used to implement the support, diagnostic and remediation operations.

As described, the malfunctioning IHS may be provided access to a service OS by the peer IHS via the peer-to-peer connection that is established in response to a mayday beacon. In certain embodiments, the peer IHS preemptively stores the service OS that is provided to the malfunctioning IHS. The service OS may be stored in a designated peer remediation partition of the peer IHS. A peer IHS may utilize a remediation partition to store multiple service operating systems. As described, the service operating systems that are preemptively stored by a peer IHS may be selected based on a variety of factors, including the platform type of neighboring IHSs.

Once the peer-to-peer connection has been established, at step 320, the peer IHS may provide the malfunctioning IHS with peer remediation instructions. In certain embodiments, the peer remediation instructions include the location of one or more service OSs stored by the peer IHS. The malfunctioning IHS may receive these peer remediation instructions and, at step 325, store the instructions to a Non-Volatile Memory (NVM) or flash memory. In certain embodiments, the NVM in which the remediation instructions are stored is a predefined region of the storage available to the BIOS/UEFI of the malfunctioning IHS. In addition to including the location of one or more service OS's available on a peer IHS, the remediation instructions stored in the predefined region of the BIOS/UEFI NVM may include other remediation instructions that are accessible to the firmware of the malfunctioning IHS and to applications provided after a service OS or a primary OS is loaded by the malfunctioning IHS. In certain system, such a predefined storage of the BIOS/UEFI may be referred to as a "mailbox" of the BIOS/UEFI. In certain embodiments, the peer remediation instructions may provide the malfunctioning IHS with a set of service OSs that are available at the peer IHS. As described, the malfunctioning IHS may then select the most suitable service OS from those that are available. In other embodiments, the peer IHS may select the service OS that is made available to the malfunctioning IHS based on diagnostic information provided by the malfunctioning IHS. In certain embodiments, the service OS stored on the peer IHS that is made available to the malfunctioning IHS is selected by a diagnostic service.

Once the service OS to be booted by the malfunctioning IHS has been determined, at step 330, the malfunctioning IHS may mount the location of the selected service OS. In certain embodiments, the malfunctioning IHS may mount the remediation partition of the peer IHS storing the selected service OS. Embodiments may utilize various mechanisms and techniques for mounting a remediation partition. For instance, in certain embodiments, the location of the service OS on the peer IHS may be mounted by the malfunctioning IHS as an iSCSI (Internet Small Computer System Interface) volume. ISCSI is an Internet Protocol (IP)-based storage standard that may be used for linking data storage facilities. ISCSI allows two IHSs to negotiate and then exchange SCSI commands using IP networks to create a storage area network (SAN). In embodiments that utilize iSCSI to mount the location of the remediation partition on the peer IHS, the malfunctioning IHS may utilize SCSI commands transmitted via the peer-to-peer connection to access a service OS stored in the mounted iSCSI volume of the peer IHS.

Once the service OS location is mounted, the malfunctioning IHS prepares to boot the service OS by changing the boot order maintained by the BIOS/UEFI of the malfunctioning IHS. Upon restart, at step 335, the malfunctioning IHS boots the service OS over the peer-to-peer connection from the mounted remediation partition that stores the service OS on the peer IHS. Booted in this manner, the service OS allows remediation to continue via the peer IHS at step 340.

In certain embodiments, once booted by the malfunctioning IHS, the service OS may be configured to provide a remediation interface that is accessible via the peer IHS. Configured in this manner, a service OS executes on the hardware of the malfunctioning IHS, and provides a remediation interface that is accessible by the peer IHS via the authenticated peer-to-peer connection. The service OS provides the capability to report diagnostic information pertaining to the hardware of the malfunctioning IHS. The remediation interface may include a software interface that can be accessed by diagnostic services running locally on the peer IHS or by remote diagnostic services configured to access the service OS via the remediation interface provided by the peer IHS. The remediation interface may also include one or graphical user interfaces or command line interfaces that may be used by an administrator to that may be accessing the peer IHS directly or remotely.

Figure 4:
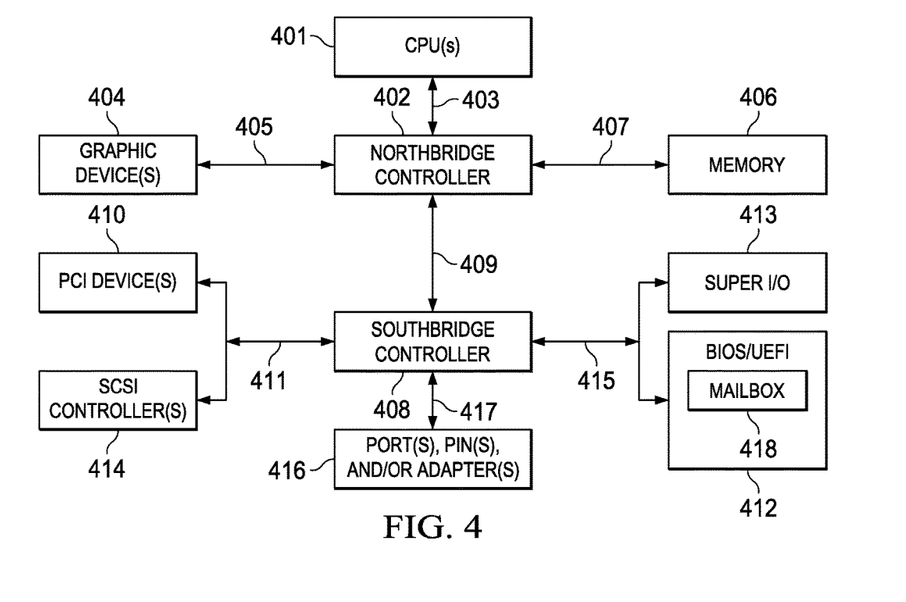
FIG. 4 is a block diagram illustrating certain components of an IHS.

FIG. 4 is a block diagram of certain components of an IHS, as described above with respect to a malfunctioning IHS and a peer IHS, according to various embodiments. As illustrated, an IHS may include one or more CPUs 401. In various embodiments, an IHS may be a single-processor system including one CPU 401, or a multi-processor system including two or more CPUs 401 (e.g., two, four, eight, or any other suitable number). CPU(s) 401 may include any processor capable of executing program instructions. For example, in various embodiments, CPU(s) 401 may be general-purpose or embedded processors implementing any of a variety of Instruction Set Architectures (ISAs), such as the x86, POWERPC®, ARM®, SPARC®, or MIPS® ISAs, or any other suitable ISA. In multi-processor systems, each of CPU(s) 401 may commonly, but not necessarily, implement the same ISA.

In certain embodiments, CPU(s) 401 are coupled to northbridge controller or chipset 401 via front-side bus 403. Northbridge controller 402 may be configured to coordinate I/O traffic between CPU(s) 401 and other components. For example, in the illustrated embodiment, northbridge controller 402 is coupled to graphics device(s) 404 (e.g., one or more video cards or adaptors) via graphics bus 405 (e.g., an Accelerated Graphics Port or AGP bus, a Peripheral Component Interconnect or PCI bus, or the like). Northbridge controller 402 may also be coupled to system memory 406 via memory bus 407. According to various embodiments, memory 406 may be configured to store program instructions, such as peer remediation programs, and/or data accessible by CPU(s) 401. In various embodiments, memory 406 may be implemented using any suitable memory technology, such as static RAM (SRAM), synchronous dynamic RAM (SDRAM), nonvolatile/Flash-type memory, or any other type of memory.

Northbridge controller 402 may be coupled to southbridge controller or chipset 408 via internal bus 409. Southbridge controller 408 may be configured to handle various I/O capabilities supported by an IHS, and it may provide interfaces such as, for instance, Universal Serial Bus (USB), audio, serial, parallel, Ethernet, or the like via port(s), pin(s), and/or adapter(s) 416 over bus 417. For example, southbridge controller 408 may be configured to allow peer-to-peer connections between two IHSs, such as a malfunctioning IHS and a peer IHS. In various embodiments, southbridge controller 408 may support communication via wired or wireless general data networks, such as any suitable type of Ethernet network, for example; via telecommunications/telephony networks such as analog voice networks or digital fiber communications networks; via storage area networks such as Fiber Channel SANs; or via any other suitable type of network and/or protocol. As described, the I/O capabilities of an IHS may be utilized to interface via a peer-to-peer wireless communication protocol, such as Wi-Fi Direct, with a peer IHS in the operation of a peer remediation service.

Southbridge controller 408 may also enable connection to one or more keyboards, keypads, touch screens, scanning devices, voice or optical recognition devices, or any other devices suitable for entering or retrieving data. Multiple I/O devices may be present in an IHS. In some embodiments, I/O devices may be separate from an IHS and may interact with an IHS through a wired or wireless connection. As shown, southbridge controller 408, may be further coupled to one or more PCI devices 410 (e.g., modems, network cards, sound cards, or video cards) and to one or more SCSI controllers 414 via parallel bus 411. Southbridge controller 408 is also coupled to Basic I/O System (BIOS)/UEFI 412 and to Super I/O Controller 413 via Low Pin Count (LPC) bus 415. Super I/O Controller 413 combines interfaces for a variety of lower bandwidth or low data rate devices. Those devices may include, for example, floppy disks, parallel ports, keyboard and mouse, temperature sensor and fan speed monitoring/control, among others.

BIOS/UEFI 412 may include non-volatile memory having program instructions stored thereon. Those instructions may be usable CPU(s) 401 to initialize and test other hardware components and/or to load an Operating System (OS) onto IHS. The BIOS/UEFI 412 initializes and tests the hardware components of an IHS, executes any pre-boot processes, such as Dell ePSA diagnostic processes in certain embodiments, and loads a boot loader or an OS from a memory device. The BIOS/UEFI 412 provides an abstraction layer for the hardware which enables software executed by the IHS to interact with certain I/O devices such as keyboards, displays, etc. Incidentally, the Unified Extensible Firmware Interface (UEFI) was designed as a successor to BIOS to address certain technical issues. As a result, modern IHSs predominantly use UEFI firmware and the term BIOS, as used herein, is intended also encompass UEFI firmware and future variations thereof. In certain embodiments, the BIOS/UEFI has access to predefined region of the non-volatile storage that is available for storing information and instructions. In certain system, this non-volatile storage accessible to the BIOS/UEFI may be referred to as a "mailbox". In the illustrated embodiments, BIOS/UEFI 412 includes a mailbox 418 that is a non-volatile memory configured to receive and store data in the form of mailbox "messages." As described, the BIOS/UEFI mailbox 418 may be used in certain embodiments, to transmit, store and execute peer remediation resources and instructions.

It should be understood that various operations described herein may be implemented in software executed by processing circuitry, hardware, or a combination thereof. The order in which each operation of a given method is performed may be changed, and various operations may be added, reordered, combined, omitted, modified, etc. It is intended that the invention(s) described herein embrace all such modifications and changes and, accordingly, the above description should be regarded in an illustrative rather than a restrictive sense.

The terms "tangible" and "non-transitory," as used herein, are intended to describe a computer-readable storage medium (or "memory") excluding propagating electromagnetic signals; but are not intended to otherwise limit the type of physical computer-readable storage device that is encompassed by the phrase computer-readable medium or memory. For instance, the terms "non-transitory computer readable medium" or "tangible memory" are intended to encompass types of storage devices that do not necessarily store information permanently, including, for example, RAM. Program instructions and data stored on a tangible computer-accessible storage medium in non-transitory form may afterwards be transmitted by transmission media or signals such as electrical, electromagnetic, or digital signals, which may be conveyed via a communication medium such as a network and/or a wireless link.

Although the invention(s) is/are described herein with reference to specific embodiments, various modifications and changes can be made without departing from the scope of the present invention(s), as set forth in the claims below. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

The invention claimed is:

1. A method for remediation of a malfunctioning IHS (Information Handling System), the method comprising:
broadcasting a peer-to-peer wireless signal indicating a failure condition in the malfunctioning IHS, wherein the peer-to-peer wireless signal includes an SSID (Service Set Identifier) indicating a remediation request by the malfunctioning IHS;
receiving a response to the peer-to-peer wireless signal from a peer IHS configured to provide a remediation resource;
establishing a peer-to-peer wireless connection with the peer IHS;
accessing a remediation resource via the peer IHS through the peer-to-peer wireless connection; and
running the remediation resource on the malfunctioning IHS.

2. The method of claim 1, wherein the peer-to-peer wireless signal is a Wi-Fi Direct signal.

3. The method of claim 1, wherein the remediation resource is a service operating system.

4. The method of claim 3, further comprising:
booting the service operating system from the peer IHS over the peer-to-peer wireless connection.

5. The method of claim 4, wherein the booted service operating system provides a remediation interface on the peer IHS that allows remote access to the service operating system.

6. The method of claim 1, wherein the remediation resource has been preemptively stored in a memory of the peer IHS based on the platform of the malfunctioning IHS.

7. The method of claim 1, wherein the wireless broadcast signal is triggered by one or more boot failures by the malfunctioning IHS.

8. A method for remediation of a malfunctioning IHS (Information Handling System) by a peer IHS, the method comprising:
monitoring for a peer-to-peer wireless signal broadcast indicating a failure condition in the malfunctioning IHS, wherein the monitoring is triggered based upon a user-issued command;
responding to the peer-to-peer wireless signal broadcast;
establishing a peer-to-peer wireless connection with the malfunctioning IHS; and
providing a remediation resource to the malfunctioning IHS via the peer-to-peer wireless connection.

9. The method of claim 8, further comprising:
receiving error condition information from the malfunctioning IHS via the peer-to-peer wireless connection; and
retrieving the remediation resource from a remote repository, wherein the remediation resource is retrieved based on the error condition received from the malfunctioning IHS.

10. The method of claim 8, further comprising:
determining the platform type of one or more IHSs within wireless signal broadcast range; and
storing one or more remediation resources based on the determined platform types.

11. The method of claim 10, wherein the remediation resource provided to the malfunctioning IHS is remediation resource stored based on the determined platform types.

12. The method of claim 8, wherein the peer-to-peer wireless signal is a Wi-Fi Direct signal.

13. The method of claim 12, wherein the peer-to-peer wireless signal broadcast includes an SSID (Service Set Identifier) indicating a remediation request by the malfunctioning IHS.

14. The method of claim 8, wherein the remediation resource is a service operating system.

15. The method of claim 14, wherein the service operating system is booted by the malfunctioning IHS from the peer IHS over the peer-to-peer wireless connection.

16. The method of claim 15, wherein the booted service operating system provides a remediation interface on the peer IHS that allows remote access to the service operating system.

17. A method, comprising:
monitoring for a peer-to-peer wireless broadcast signal indicating a failure condition in a malfunctioning IHS;
establishing a peer-to-peer wireless connection with the malfunctioning IHS;
receiving error condition information from the malfunctioning IHS via the peer-to-peer wireless connection;

retrieving a remediation resource from a remote repository, wherein the remediation resource is selected based on the error condition received from the malfunctioning IHS; and providing the remediation resource to the malfunctioning IHS via the peer-to-peer wireless connection, wherein at least one of: (i) the monitoring is triggered based on a user-issued command; or (ii) the peer-to-peer wireless broadcast signal includes an SSID (Service Set Identifier) indicating a remediation request by the malfunctioning IHS.

18. The method of claim 17, further comprising:

determining the platform type of one or more IHSs within wireless range; and storing one or more remediation resources based on the determined platform type.

* * * * *